(12) United States Patent
Choi

(10) Patent No.: US 10,017,166 B2
(45) Date of Patent: Jul. 10, 2018

(54) ELECTRONIC PARKING BRAKE SYSTEM IN VEHICLE AND CONTROL METHOD THEREOF

(71) Applicant: MANDO CORPORATION, Pyeongtaek-si, Gyeonggi-do (KR)

(72) Inventor: Ho-Jin Choi, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 202 days.

(21) Appl. No.: 15/130,495

(22) Filed: Apr. 15, 2016

(65) Prior Publication Data

US 2016/0304069 A1    Oct. 20, 2016

(30) Foreign Application Priority Data

Apr. 15, 2015  (KR) .................. 10-2015-0052966

(51) Int. Cl.
| | | |
|---|---|---|
| *G06F 7/70* | (2006.01) | |
| *B60T 8/32* | (2006.01) | |
| *B60T 7/12* | (2006.01) | |

(52) U.S. Cl.
CPC ............ *B60T 8/3205* (2013.01); *B60T 7/122* (2013.01); *B60T 2201/06* (2013.01)

(58) Field of Classification Search
CPC ..... B60T 8/3205; B60T 7/122; B60T 2201/06
See application file for complete search history.

(56) References Cited

U.S. PATENT DOCUMENTS

| | | | | |
|---|---|---|---|---|
| 4,826,205 A | * | 5/1989 | Kouda | ................. B60G 17/016 188/266.2 |
| 6,411,870 B1 | * | 6/2002 | Sato | ........................ B60T 7/124 33/287 |
| 2005/0209742 A1 | * | 9/2005 | Sakakibara | ........... B60W 50/00 701/1 |
| 2010/0049438 A1 | * | 2/2010 | Hu | ........................ G01C 21/26 701/469 |
| 2012/0200058 A1 | * | 8/2012 | Sekiya | .................... B60T 8/346 280/124.162 |

* cited by examiner

*Primary Examiner* — Hussein Elchanti
(74) *Attorney, Agent, or Firm* — McDermott Will & Emery LLP

(57) ABSTRACT

Disclosed herein are an electronic parking brake system and a method of controlling the same. The electronic parking brake system includes a wheel speed sensor which senses a movement of a vehicle; a vertical acceleration sensor which measures a vertical acceleration value; an electronic control unit (ECU) which determines whether the vehicle is rolling based on the movement of the vehicle and the vertical acceleration value; and a parking brake which brakes the vehicle based on the determination of whether the vehicle is rolling by the ECU.

8 Claims, 7 Drawing Sheets

ELECTRONIC PARKING BRAKE SYSTEM IN VEHICLE AND CONTROL METHOD THEREOF

CROSS-REFERENCE TO RELATED APPLICATION

This application claims the benefit of Korean Patent Application No. 2015-0052966, filed on Apr. 15, 2015 in the Korean Intellectual Property Office, the disclosure of which is incorporated herein by reference.

BACKGROUND

1. Field

Embodiments of the present disclosure relate to an electronic parking brake (EPB) system in a vehicle and a control method of the same, and more particularly, to an EPB system which restricts a brake re-clamp due to shaking of a vehicle being detected and misjudged as rolling.

2. Description of the Related Art

Generally, a brake system generally includes a parking brake such as a so called hand brake or side brake which maintains a vehicle in a stopped state. The parking brake is operated by a driver operating a parking lever provided at a side of the driver's seat in the vehicle. When the driver pulls the parking lever and a cable connected to the parking lever is pulled, a brake assembly of a side of a rear wheel connected to the cable is operated and braking power is generated, and conversely, when the parking lever is released and the cable is released, the braking power is released.

However, since an operating method of the parking brake according to the parking lever is performed by a will of the driver, when the vehicle is parked at an inclined road without pulling the parking lever due to a carelessness of the driver, an unexpected accident such as the vehicle rolling down the inclined road may occur.

In addition, since the driver has to operate the parking lever whenever parking the vehicle or starting to drive the vehicle, there are problems in that use is very cumbersome, and particularly, the use is further cumbersome to a weak woman or the elderly.

Accordingly, recently, an electronic parking brake (EPB) system, which electrically controls driving a brake, is installed in a conventional disc brake and performs a parking brake function.

Even though a driver does not manually operate the parking brake, the EPB system may automatically operate or release the parking brake according to a simple operation of a switch or control of an electronic control unit (ECU) which governs overall control of the EPB system.

In addition, a vehicle on an inclined road may roll when a user manually operates the parking brake and fastening of the brake is incomplete, and the EPB system detects the rolling and automatically re-clamps the parking brake when the vehicle rolls on the inclined road.

Such an EPB system includes an actuator having a motor which generates braking power, and an ECU for driving the actuator. The ECU includes a controller, a plurality of sensor interfaces, a motor driver, and a communication module. The ECU drives the actuator according to an operation state of a switch and operates or releases the EPB system.

SUMMARY

Therefore, it is an aspect of the present disclosure to prevent false detection of movements of a driver or a passenger inside or outside a vehicle as a rolling of the vehicle.

It is another aspect of the present disclosure to prevent unnecessary operations and to decrease a load of a vehicle and a system by determining whether it is a vehicle shaking mode or a vehicle rolling mode using a vertical acceleration sensor, re-clamping a parking brake when it is the vehicle rolling mode, and restricting a re-clamping of the parking brake when it is a simple vehicle shaking mode.

Additional aspects of the disclosure will be set forth in part in the description which follows and, in part, will be obvious from the description, or may be learned by practice of the disclosure.

In accordance with one aspect of the present invention, an electronic parking brake (EPB) system includes a wheel speed sensor which senses a movement of a vehicle; a vertical acceleration sensor which measures a vertical acceleration value; an electronic control unit (ECU) which determines whether the vehicle is rolling based on the movement of the vehicle and the vertical acceleration value; and a parking brake which brakes the vehicle based on the determination of whether the vehicle is rolling by the ECU.

The ECU may include a comparator which determines whether an absolute value of the vertical acceleration value is greater than a predetermined reference value; a counting portion which counts a number of times when the absolute value of the vertical acceleration value is greater than the reference value; and a re-clamp restrictor which fastens the parking brake when the number is equal to or less than a predetermined reference counting number, and restricts fastening the parking brake when the number is greater than the predetermined reference counting number.

The ECU may further include a rolling determination portion which determines that the vehicle is rolling when the number is equal to or less than the predetermined reference counting number; and a shaking determination portion which determines that the vehicle is shaking when the number is greater than the predetermined reference counting number.

The ECU may disable a rolling detection of the vehicle by the wheel speed sensor of the vehicle, when the shaking is determined.

In accordance with another aspect of the present invention, a method of an electronic parking brake (EPB) system includes a vertical acceleration sensor which measures a vertical acceleration value; an ECU which determines whether a vehicle is shaking based on the vertical acceleration value; and a parking brake which brakes the vehicle based on the determination of whether the vehicle is shaking by the ECU.

The ECU may include a comparator which determines whether an absolute value of the vertical acceleration value is greater than a predetermined reference value; a counting portion which counts a number of times when the absolute value of the vertical acceleration value is greater than the reference value; and a re-clamp restrictor which fastens the parking brake when the number is equal to or less than a predetermined reference counting number, and restricts fastening the parking brake when the number is greater than the predetermined reference counting number.

The ECU may further include a rolling determination portion which determines that the vehicle is rolling when the number is equal to or less than the predetermined reference counting number; and a shaking determination portion which determines that the vehicle is shaking when the number is greater than the predetermined reference counting number.

The system may perform the counting when the vehicle is stopped.

In accordance with another aspect of the present invention, a control method of an electronic parking brake (EPB) system includes sensing a movement of a vehicle by a wheel speed sensor of the vehicle; measuring a vertical acceleration value by a vertical acceleration sensor of the vehicle; determining whether the vehicle is rolling based on the vertical acceleration value and the movement of the vehicle; and re-clamping a parking brake of the vehicle based on the determining of whether the vehicle is rolling.

The control method may further include restricting the re-clamping of the parking brake when the vehicle is determined to be shaking.

The control method may further include disabling a rolling detection of the vehicle by the wheel speed sensor of the vehicle when the vehicle is determined to be shaking.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
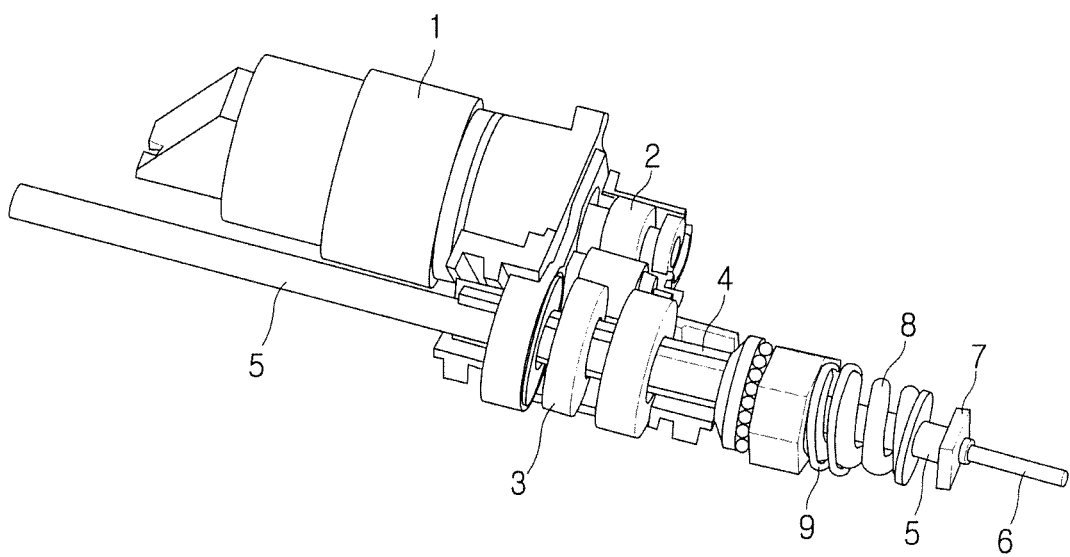
FIG. 1 is a perspective view illustrating a brake which may be used in one embodiment of the present disclosure.

Hereinafter, embodiments of the present disclosure will be described in detail with reference to the accompanying drawings. The following embodiments are examples to provide the scope of the present disclosure to those skilled in the art. The present disclosure is not limited to the following embodiments and may be implemented in different forms. In the drawings, portions which are not related to the description may be omitted for clarifying the present disclosure, and sizes of components may be exaggerated for understanding the present disclosure.

According to one embodiment of the present disclosure, FIG. 1 is a perspective view illustrating a brake which may be used in one embodiment of the present disclosure.

Referring to FIG. 1, an electrical parking brake (EPB) system includes a motor 1 which is driven for operating or releasing an EPB, a multi stage gear 2 connected to the motor 1, a gear wheel 3 mechanically linked to the multi stage gear 2, a screw nut 4 integrally fixed to an inner circumferential surface of the gear wheel 3 and having a hollow shape, a spindle 5 gear-coupled to an inner circumferential surface of the screw nut 4 and moved along a shaft direction according to rotation of the gear wheel 3, a parking cable 6 connected to an outlet side of the spindle 5 (an operation side of the parking cable) around the gear wheel 3, and a stopper member 7 fixed to an outer circumferential surface of the spindle 5 connected to the parking cable 6 and configured to prevent the spindle 5 from being rotated by excessive pulling when the stopper member 7 is pulled to operate the brake.

In addition, first and second springs 8 and 9, which control power that pulls or releases the parking cable 6 by rotation of the gear wheel 3 and the screw nut 4 which are driven by the motor 1, may be further installed between the gear wheel 3 and the stopper member 7.

A re-clamp operation refers to an operation which assists in the case of the spindle 5 being insufficiently pulled when the brake is operated and the parking cable 6 is pulled, wherein the vehicle rolls due to the parking cable 6 of a user being insufficiently fastened.

A rolling phenomenon of a vehicle refers to the vehicle moving in a direction opposite to a traveling direction of the vehicle.

Figure 2:
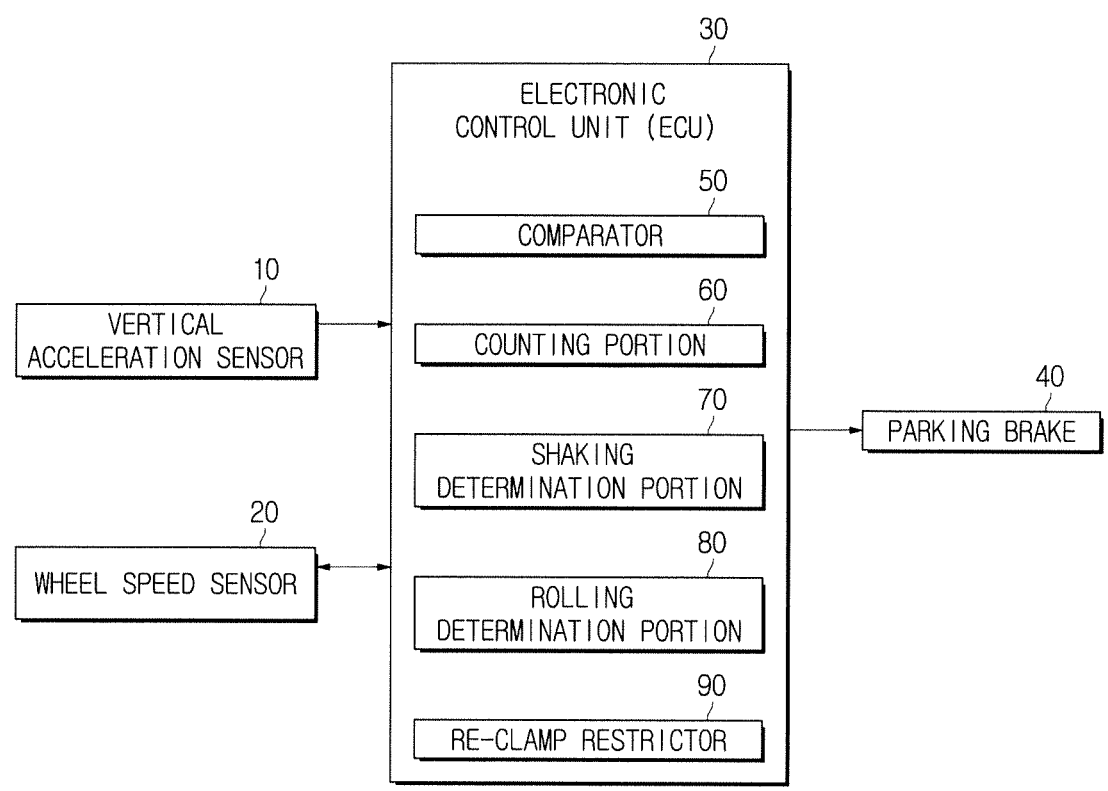
FIG. 2 is a view illustrating a control block diagram of an EPB system according to one embodiment of the present disclosure.

FIG. 2 is a view illustrating a control block diagram of an EPB system according to one embodiment of the present disclosure.

According to one embodiment of the present disclosure, the EPB system may include a vertical acceleration sensor 10, a wheel speed sensor 20, an electronic control unit (ECU) 30, and a parking brake 40.

The vertical acceleration sensor 10 may sense an up and down movement (hereinafter, referred to as a vertical direction) of a vehicle. Such a vertical acceleration sensor 10, which is a vertical sensor of an acceleration sensor and a component which detects a change in a vertical direction speed per unit of time, may sense and measure dynamic power such as an acceleration, a vibration, and an impact using principles of an inertial force, electrostriction, and a gyro.

The wheel speed sensor 20 may sense a movement of the vehicle (a rolling or a shaking) and transmit a detection signal to the ECU 30. In addition, rolling detection of the wheel speed sensor 20 may be controlled by the ECU 30 to be disabled.

Specific structures and operations of the vertical acceleration sensor 10 and the wheel speed sensor 20 will be described in detail bellow.

The ECU 30 totally controls the EPB system.

The ECU 30 includes a comparator 50, a counting portion 60, a shaking determination portion 70, a rolling determination portion 80, and a re-clamp restrictor 90.

The comparator 50 determines whether an absolute value of a vertical acceleration value of the vertical acceleration sensor is greater than a preset reference value.

According to the embodiment of the present disclosure, although the comparator 50 determines whether the absolute value of the vertical acceleration value is greater than the preset reference value, the comparator 50 is not limited thereto, and the comparator 50 may also determine whether the absolute value of the vertical acceleration value is less than the preset reference value.

The counting portion 60 counts whether the number of points where the absolute value of the vertical acceleration value is greater than the preset reference value is greater than a preset arbitrary reference counting number.

The shaking determination portion 70 determines that the vehicle is shaken by an external impact when a number counted by the counting portion 60 is greater than the preset arbitrary reference counting number.

In addition, when the vehicle is determined to be shaken, the shaking determination portion 70 may disable a rolling detection of the wheel speed sensor 20.

When a traveling direction of the vehicle is represented as an X-axis, and a lateral direction of the vehicle is represented as a Y-axis, shaking of the vehicle means that the vehicle moves linearly back and forth, left and right, and up and down along the X-axis, Y-axis, or Z-axis direction.

The rolling determination portion 80 determines that the vehicle is rolling when the number counted by the counting portion 60 is equal to or less than the preset arbitrary reference counting number.

A re-clamp restrictor 90 may restrict re-clamping of the parking brake 40 of the vehicle when the shaking determination portion 70 determines that the vehicle is shaking.

The parking brake 40 may be re-clamped through control of the ECU 30.

Figure 3:
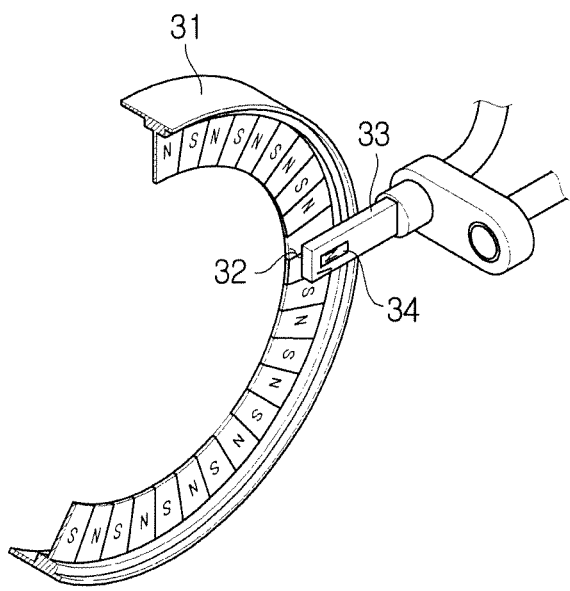
FIG. 3 is a view illustrating a wheel speed sensor.
Figure 4:
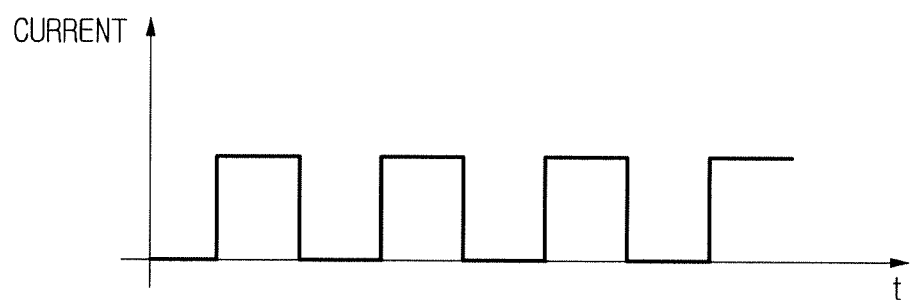
FIG. 4 is a view illustrating a graph related to a voltage measured by the wheel speed sensor.

FIG. 3 is a view illustrating a wheel speed sensor, and FIG. 4 is a view illustrating a graph related to a voltage measured by the wheel speed sensor.

According to FIG. 3, the wheel speed sensor includes a sensor rotor 31 and a pick-up 33, and when the rotor 31 rotates in a magnetic field having a predetermined intensity generated by a magnet included in the sensor rotor 31, since a gap 32, which is an interval between the sensor rotor 31 and the pick-up 33, is increased or decreased proportionally to the number of revolutions, a magnetic resistance of a magnetic circuit including a pole piece 34 and a rotor 31 varies.

The rotor 31 may rotate when the vehicle moves. Since the rotor 31 does not rotate when the vehicle is stopped, an induced voltage due to a magnet included in the sensor rotor 31 is not generated.

Accordingly, a state in which the vehicle is moving may be sensed through the generation of the induced voltage.

Since a level of the induced voltage generated through vehicle movement is proportional to a rotation speed of a wheel of the vehicle, the rotation speed of the wheel may be detected.

The sensor rotor 31 includes a magnet and a coil, and the gap 32 is maintained in the range of 0.2 to 1.3 mm, and at this point, an alternating current (AC) flowing through the coil varies according to a variation of a magnetic flux.

According to FIG. 4, a variation in an AC generated according to the magnetic flux may be converted into a sinusoidal signal by a digital signal. Accordingly, the signal is transmitted to the ECU 30 in a form of current signal by using pulse width modulation, and when the signal does not maintain a constant value and repeats in a form of a pulse type as illustrated in the graph in FIG. 4, a state in which the vehicle is moving may be sensed.

Figure 5:
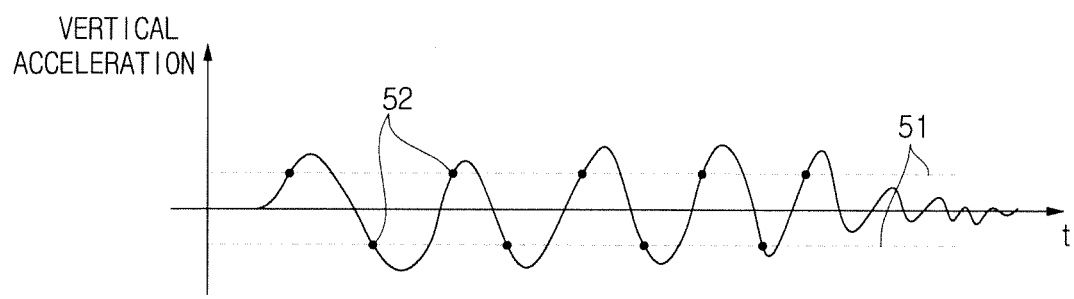
FIG. 5 is a view illustrating a graph for showing a vertical acceleration value versus time (a time axis).

FIG. 5 is a view illustrating a graph for showing a vertical acceleration value versus time (a time axis).

According to the embodiment of the present disclosure, a predetermined reference value 51 is preset with respect to a vertical acceleration value, and the ECU counts when an absolute value of a varying vertical acceleration value is greater than the reference value 51.

The shaking determination portion 70 in the ECU 30 determines that the vehicle is shaking when a counted number is greater than a preset reference counting value, and the rolling determination portion 80 in the ECU 30 determines that the vehicle is rolling when the counted number is equal to or less than the preset reference counting value.

Figure 6:
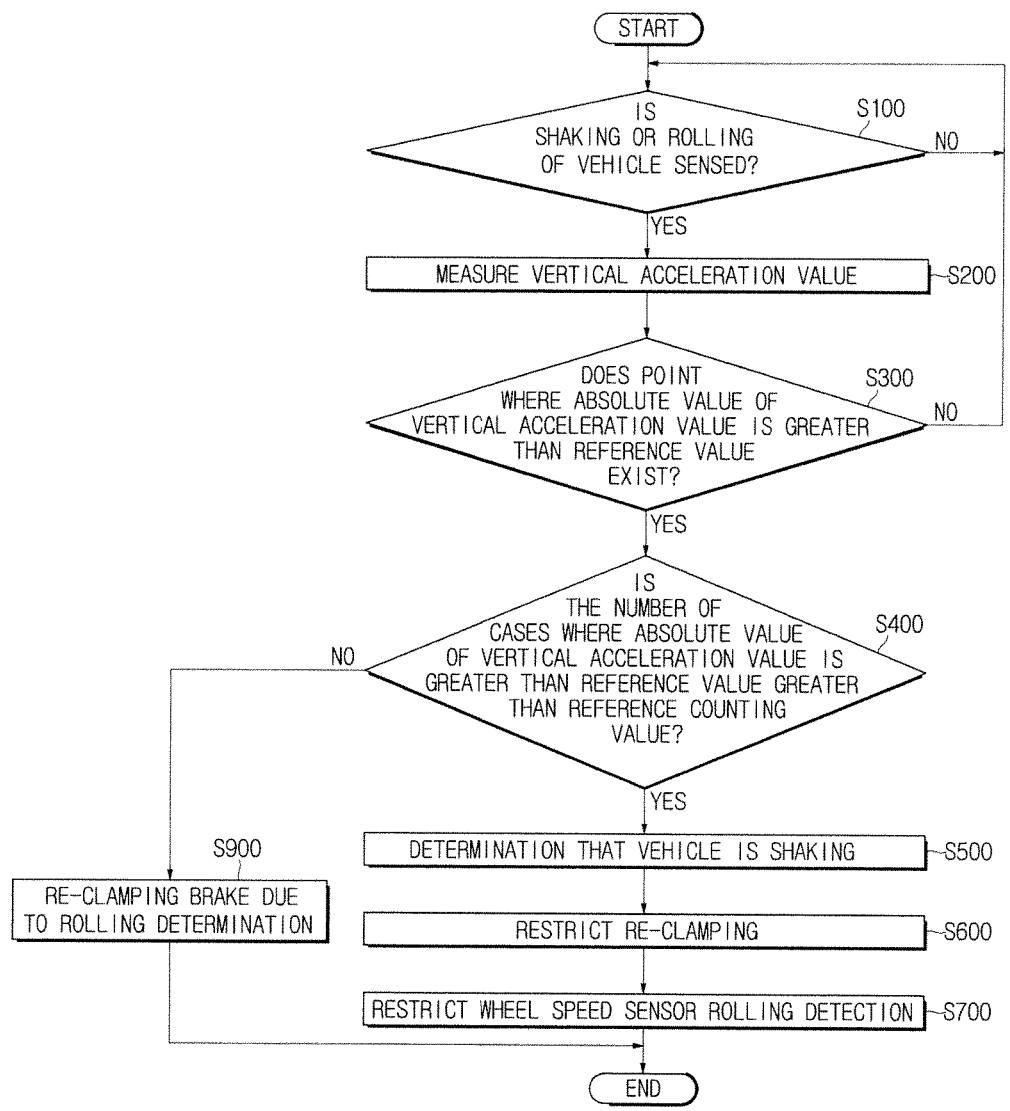
FIG. 6 is a view illustrating a flow chart describing a control method of the EPB system according to one embodiment of the present disclosure.

FIG. 6 is a view illustrating a flow chart describing a control method of the EPB system according to one embodiment of the present disclosure.

According to the embodiment of the present disclosure, whether a detected state is a shaking or a rolling of the vehicle is determined (S100).

When the detected state is a shaking or a rolling of the vehicle, the vertical acceleration sensor 10 measures a vertical acceleration value (S200).

The comparator 50 of the ECU 30 determines whether points where an absolute value of the measured vertical acceleration value is greater than a preset reference value exist (S300). When points where the absolute value of the measured vertical acceleration value is greater than the preset reference value do not exist (NO in S300), S100 is restarted.

When points where the absolute value of the measured vertical acceleration value is greater than the preset reference value exist (YES in 300), the counting portion 60 determines whether the number of counted points where the absolute value of the measured vertical acceleration value is greater than the preset reference value is greater than a reference counting value in a preset reference time (S400).

When the counted number is equal to or less than the preset reference counting value in the preset reference time (NO in S400), the vehicle is determined to be rolling and a brake is re-clamped (S900).

When the counted number is greater than the preset reference counting value in the preset reference time (YES in S400), the shaking determination portion 70 determines that the vehicle is shaking (S500).

When the shaking determination portion 70 in the ECU 30 determines that the vehicle is shaking (S500), the re-clamp restrictor 90 restricts a re-clamping of the parking brake 40 (S600).

In addition, the ECU 30 restricts rolling detection of the wheel speed sensor (S700).

Figure 7:
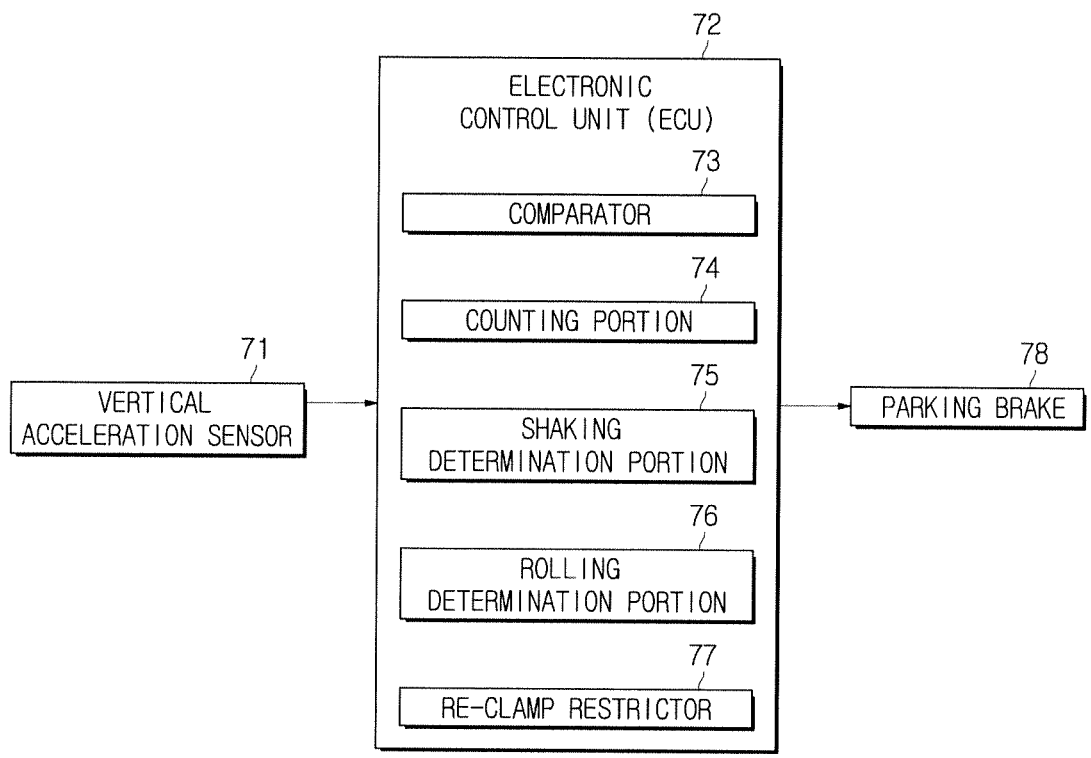
FIG. 7 is a view illustrating a block diagram of an EPB system according to another embodiment of the present disclosure.

FIG. 7 is a view illustrating a block diagram of an EPB system according to another embodiment of the present disclosure.

According to another embodiment of the present disclosure, an EPB system may include a vertical acceleration sensor 71, an ECU 72, and a parking brake 78.

The vertical acceleration sensor 71 may sense an up and down movement (hereinafter, referred to as a vertical direction) of a vehicle. Such a vertical acceleration sensor 71, which is a vertical sensor of an acceleration sensor and a component which detects a vertical direction speed per unit of time, may sense and measure dynamic power such as an acceleration, a vibration, and an impact using principles of an inertia force, electrostriction, and a gyro.

The ECU 72 totally controls the EPB system.

The ECU 72 may perform a counting operation by comparing vertical acceleration values of the vertical acceleration sensor 71 only when the vehicle is stopped.

The ECU 72 includes a comparator 73, a counting portion 74, a shaking determination portion 75, a rolling determination portion 76, and a re-clamp restrictor 77.

The comparator 73 determines whether an absolute value of a vertical acceleration value of the vertical acceleration sensor is greater than a preset reference value.

Although the comparator 73 determines whether the absolute value of the vertical acceleration value is greater than the preset reference value, the comparator 73 is not limited thereto, and the comparator 73 may also determine whether the absolute value of the vertical acceleration value is less than the preset reference value.

The counting portion 74 counts whether the number of counted points where the absolute value of the vertical acceleration value is greater than the preset reference value is greater than a preset arbitrary reference counting number.

In addition, when the number counted by the counting portion 60 is greater than the preset arbitrary reference counting number, the vehicle is determined to be shaken by an external impact.

When the number counted by the counting portion 74 is equal to or less than the preset arbitrary reference counting number, the rolling determination portion 76 determines that the vehicle is rolling.

When the shaking determination portion 75 determines that the vehicle is shaking, the re-clamp restrictor 77 may restrict a re-clamping of the parking brake 78 of the vehicle.

The parking brake 78 may be re-clamped through control of the ECU 72.

Figure 8:
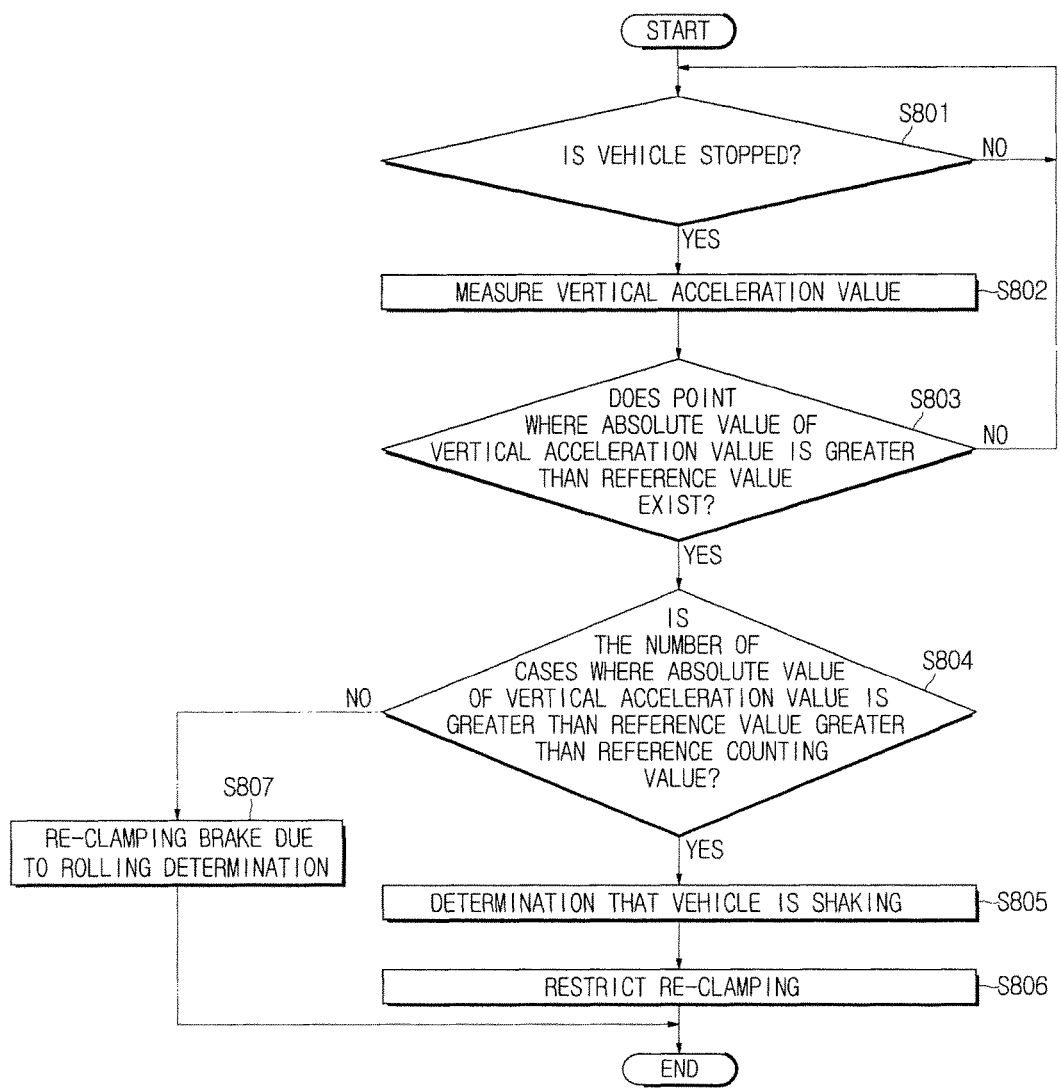
FIG. 8 is a view illustrating a flow chart of a control method of an EPB system according to another embodiment of the present disclosure.

FIG. 8 is a view illustrating a flow chart of a control method of an EPB system according to another embodiment of the present disclosure.

According to the embodiment of the present disclosure, whether a vehicle is stopped is determined (S801).

When the vehicle is stopped (YES in S801), the vertical acceleration sensor 71 measures a vertical acceleration value (S802).

The comparator 73 in the ECU 72 determines whether points where an absolute value of the measured vertical acceleration value is greater than a preset reference value exist (S803). When points where the absolute value of the measured vertical acceleration value is greater than the preset reference value do not exist (NO in S803), S801 is restarted.

When points where the absolute value of the measured vertical acceleration value is greater than the preset reference value exist (YES in S803), the counting portion 74 determines whether the number of the counted points where the absolute value of the measured vertical acceleration value is greater than the preset reference value is greater than a preset reference counting value in a preset reference time (S804).

When the counted number is equal to or less than the preset reference counting value in the predetermined time (NO in S804), the vehicle is determined to be rolling, and the brake is re-clamped (S807).

When the counted number is greater than the preset reference counting value in the preset reference preset time (YES in S804), the shaking determination portion 75 determines that the vehicle is shaking (S805).

When the shaking determination portion 75 in the ECU 72 determines that the vehicle is shaking (S805), the re-clamp restrictor 77 restricts the re-clamping of the parking brake 78 (S806).

As is apparent from the above description, a vehicle shaking and a vehicle rolling can be distinguished using a wheel speed sensor in the EPB system and a vertical acceleration value.

Accordingly, unnecessary operations and an excessive load on the EPB system can be prevented.

Although embodiments of the present disclosure are illustrated and described as described above, the disclosed disclosure is not limited to the above-described specific embodiments, it should be understood that various changed embodiments may be made by those skilled in the art therein without departing from the spirit and scope of embodiments as defined by the appended claims, and such modified embodiments may not be individually understood from the disclosed disclosure.

What is claimed is:

1. An electronic parking brake (EPB) system comprising:
a wheel speed sensor which senses a movement of a vehicle;
a vertical acceleration sensor which measures a vertical acceleration value;
an electronic control unit (ECU) which determines whether the vehicle is rolling based on the movement of the vehicle and the vertical acceleration value;
a parking brake which brakes the vehicle based on the determination of whether the vehicle is rolling by the ECU;
a comparator which determines whether an absolute value of the vertical acceleration value is greater than a reference value;
a counting portion which counts a number of times when the absolute value of the vertical acceleration value is greater than the reference value; and
a re-clamp restrictor which, while braking is applied by a driver, fastens the parking brake when the number is equal to or less than a reference counting number, and restricts fastening the parking brake when the number is greater than the reference counting number.

2. The EPB system in claim 1, wherein the ECU further includes:
a rolling determination portion which determines that the vehicle is rolling when the number is equal to or less than the reference counting number; and
a shaking determination portion which determines that the vehicle is shaking when the number is greater than the reference counting number.

3. The EPB system in claim 2, wherein when the shaking is determined, the ECU disables a rolling detection of the vehicle by the wheel speed sensor of the vehicle.

4. An EPB system comprising:
a vertical acceleration sensor which measures a vertical acceleration value;
an ECU which determines whether a vehicle is shaking based on the vertical acceleration value;
a parking brake which brakes the vehicle based on the determination of whether the vehicle is shaking by the ECU;
a comparator which determines whether an absolute value of the vertical acceleration value is greater than a reference value;
a counting portion which counts a number of times when the absolute value of the vertical acceleration value is greater than the reference value; and
a re-clamp restrictor which, while braking is applied by a driver, fastens the parking brake when the number is equal to or less than a reference counting number, and restricts fastening the parking brake when the number is greater than the reference counting number.

5. The EPB system of claim 4, wherein the ECU further includes:
a rolling determination portion which determines that the vehicle is rolling when the number is equal to or less than the reference counting number; and
a shaking determination portion which determines that the vehicle is shaking when the number is greater than the reference counting number.

6. The EPB system of claim 5, wherein the counting is performed when the vehicle is stopped.

7. A control method of an EPB system comprising:
sensing a movement of a vehicle by a wheel speed sensor of the vehicle;
measuring a vertical acceleration value by a vertical acceleration sensor of the vehicle;

determining whether the vehicle is rolling based on the vertical acceleration value and the movement of the vehicle; and re-clamping a parking brake of the vehicle based on the determining of whether the vehicle is rolling, wherein the determining of whether the vehicle is rolling includes:

counting a number of times when an absolute value of the vertical acceleration value is greater than a reference value;

determining that the vehicle is shaking when the number is greater than a reference counting number; and determining that the vehicle is rolling when the number is equal to or less than the reference counting number, and wherein the control method further comprises:

fastening the parking brake when the number is equal to or less than the reference counting number, while braking is applied by a driver; and restricting the re-clamping of the parking brake when the number is greater than the reference counting number, while braking is applied by the driver.

8. The control method of claim 7, further comprising disabling a rolling detection of the vehicle by the wheel speed sensor of the vehicle when the vehicle is determined to be shaking.

\* \* \* \* \*